United States Patent
Hsieh et al.

(10) Patent No.: US 6,795,274 B1
(45) Date of Patent: Sep. 21, 2004

(54) METHOD FOR MANUFACTURING A SUBSTANTIALLY CIRCULAR SUBSTRATE BY UTILIZING SCRIBING

(75) Inventors: John Hsieh, San Jose, CA (US); Andrew Homola, Morgan Hill, CA (US); David Vigdor Salamon, San Jose, CA (US); Holland Hodges, Dublin, CA (US)

(73) Assignee: Asahi Glass Company, Ltd., Tokyo (JP)

( * ) Notice: Subject to any disclaimer, the term of this patent is extended or adjusted under 35 U.S.C. 154(b) by 0 days.

(21) Appl. No.: 09/407,003

(22) Filed: Sep. 28, 1999

Related U.S. Application Data

(63) Continuation-in-part of application No. 09/391,139, filed on Sep. 7, 1999, now abandoned.

(51) Int. Cl.$^7$ .............................. G11B 5/82; B23K 26/90
(52) U.S. Cl. .................................... 360/135; 219/121.72
(58) Field of Search .......................... 360/135; 216/94; 219/121.72, 121.68; 438/460

(56) References Cited

U.S. PATENT DOCUMENTS

| | | | |
|---|---|---|---|
| 3,453,097 A | 7/1969 | Hafner | 65/112 |
| 3,695,497 A | 10/1972 | Dear | 225/2 |
| 3,695,498 A | 10/1972 | Dear | 225/1 |
| 3,730,408 A | 5/1973 | Dahlberg et al. | 225/2 |
| 3,740,524 A | 6/1973 | Dahlberg et al. | 219/121 LM |
| 3,790,362 A | 2/1974 | Dahlberg et al. | 65/174 |
| 4,113,162 A | 9/1978 | Boehm et al. | 225/2 |
| 4,190,184 A | 2/1980 | Oelke et al. | 225/2 |
| 4,468,534 A | 8/1984 | Boddicker | 219/121 |
| 4,833,001 A | 5/1989 | Kijima et al. | 428/141 |
| 5,040,342 A | 8/1991 | McGuire et al. | 51/283 |
| 5,084,604 A | 1/1992 | Dekker et al. | 219/121.72 |

(List continued on next page.)

FOREIGN PATENT DOCUMENTS

| | | | |
|---|---|---|---|
| DE | 4214159 C1 | 11/1993 | |
| DE | 19715537 A1 | 10/1997 | |
| EP | 0872303 A2 | 10/1998 | |
| EP | 0903327 A3 | 7/1999 | |
| JP | 7-223828 | 8/1995 | |
| JP | 7-323384 | 12/1995 | |
| JP | 7-323385 | 12/1995 | |
| JP | 9-118535 | 5/1997 | |
| JP | 10-291084 | 11/1998 | |
| SU | 1231813 A1 | 4/1991 | |
| WO | WO 9620062 A1 * | 7/1996 | ........... B23K/26/00 |
| WO | WO 9817434 A1 * | 4/1998 | ........... B23K/26/00 |
| WO | WO 98/17434 | 4/1998 | |

*Primary Examiner*—David Davis
(74) *Attorney, Agent, or Firm*—Oblon, Spivak, McClelland, Maier & Neustadt, P.C.

(57) ABSTRACT

A method for manufacturing a substrate for a magnetic disk comprises the acts of mounting a workpiece on a spindle; rotating the workpiece and scribing the workpiece to form first and second scribe lines on the top surface of the workpiece and first and second scribe lines on the bottom surface of the workpiece; and breaking the workpiece along the first and second scribe lines. The first scribe line on the top and bottom surface of the work piece defines the outer diameter of the substrate. The second scribe line on the top and bottom surface of the workpiece define the inner diameter of the substrate. Because scribe lines are formed on the top and bottom surfaces of the workpiece, the edge of the substrate is less jagged than substrates that are merely scribed on one side of the workpiece and then broken. Because the scribe lines are formed by mounting the workpiece on a spindle and rotating the substrate, the scribing can be done more precisely and quickly than scribe lines formed using an x-y platform.

36 Claims, 6 Drawing Sheets

U.S. PATENT DOCUMENTS

| | | | |
|---|---|---|---|
| 5,087,481 A | 2/1992 | Chen et al. | 427/129 |
| 5,132,505 A | 7/1992 | Zonneveld et al. | 219/121.6 |
| 5,138,131 A | 8/1992 | Nishikawa et al. | 219/121.67 |
| 5,254,833 A | 10/1993 | Okiyama | 219/121.68 |
| 5,273,733 A * | 12/1993 | Winters et al. | 423/477 |
| 5,314,522 A | 5/1994 | Kondo et al. | 65/31 |
| 5,332,411 A | 7/1994 | Ogata et al. | 65/60.1 |
| 5,609,284 A | 3/1997 | Kondratenko | 225/1 |
| 5,622,540 A | 4/1997 | Stevens | 65/112 |
| 5,759,088 A * | 6/1998 | Kondratenko | 451/41 |
| 5,776,220 A | 7/1998 | Allaire et al. | 65/112 |
| 5,826,772 A | 10/1998 | Ariglio et al. | 225/2 |
| 5,926,352 A | 7/1999 | Murayama et al. | 360/135 |
| 5,984,159 A | 11/1999 | Ostendarp et al. | 225/93.5 |

* cited by examiner

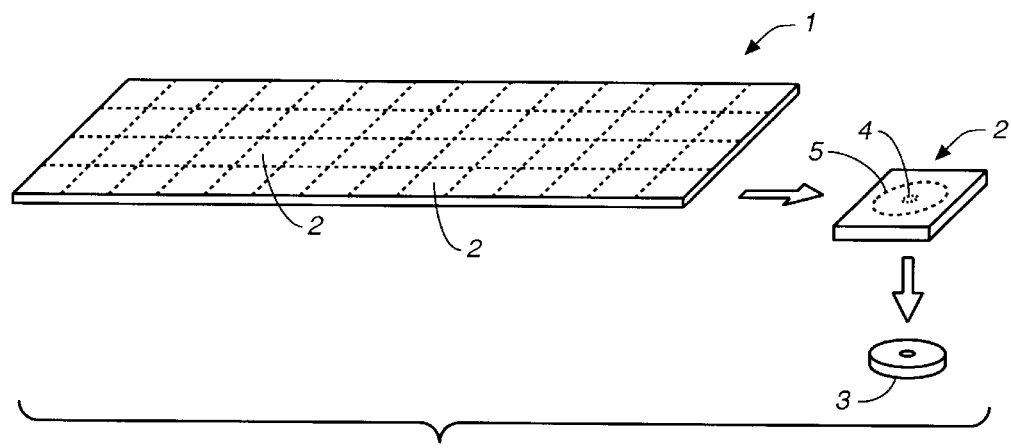
FIG._1 (PRIOR ART)
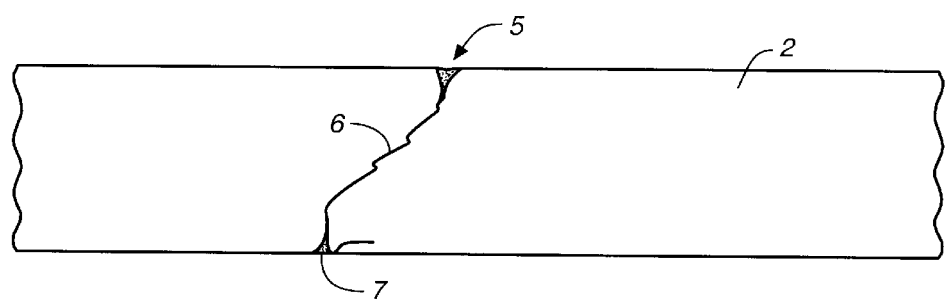
FIG._2 (PRIOR ART)

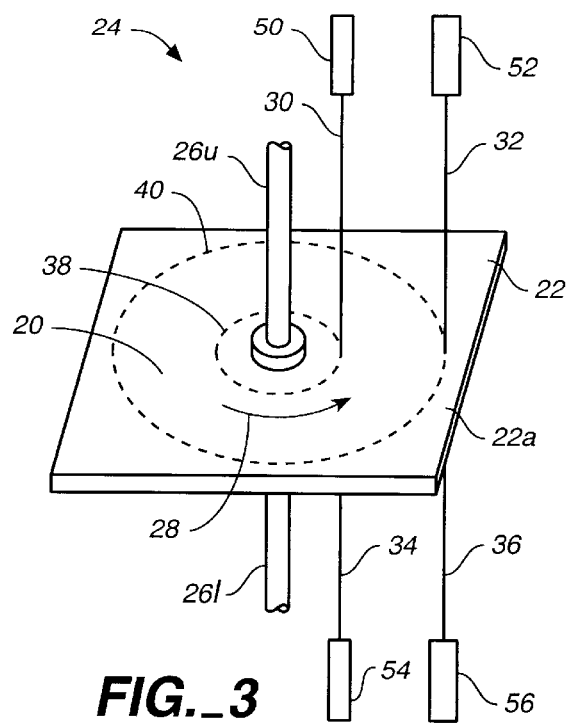
FIG._3
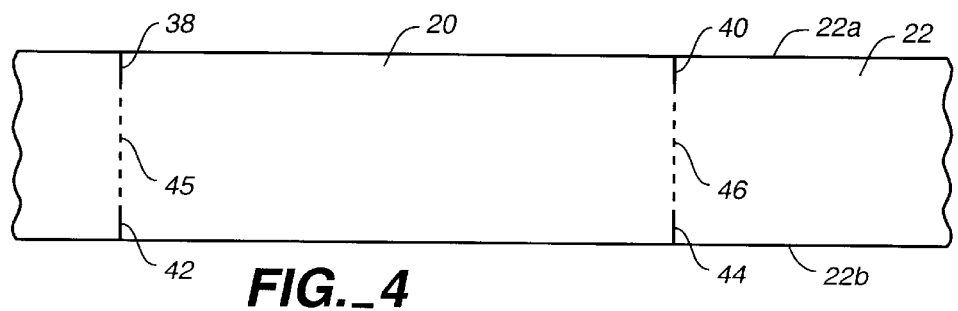
FIG._4

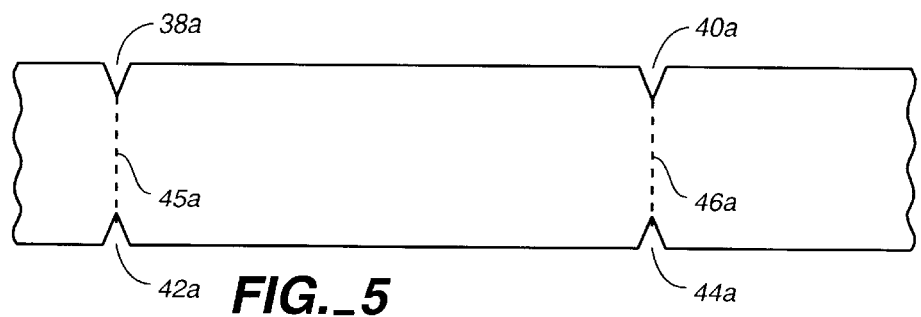
FIG._5
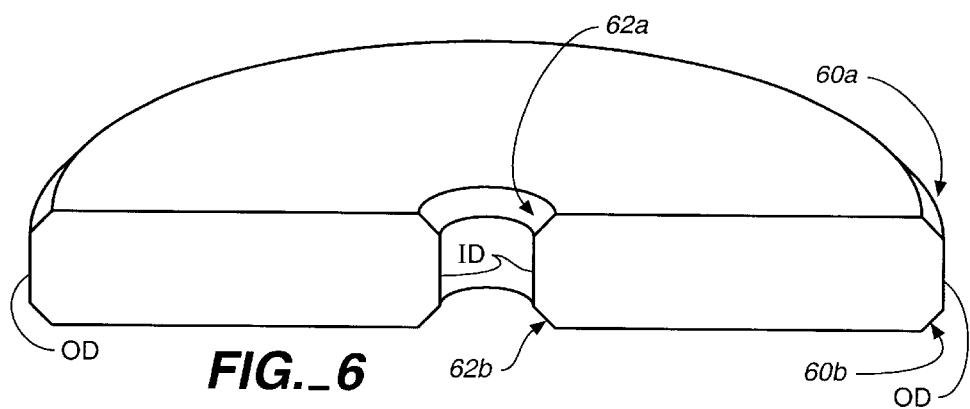
FIG._6

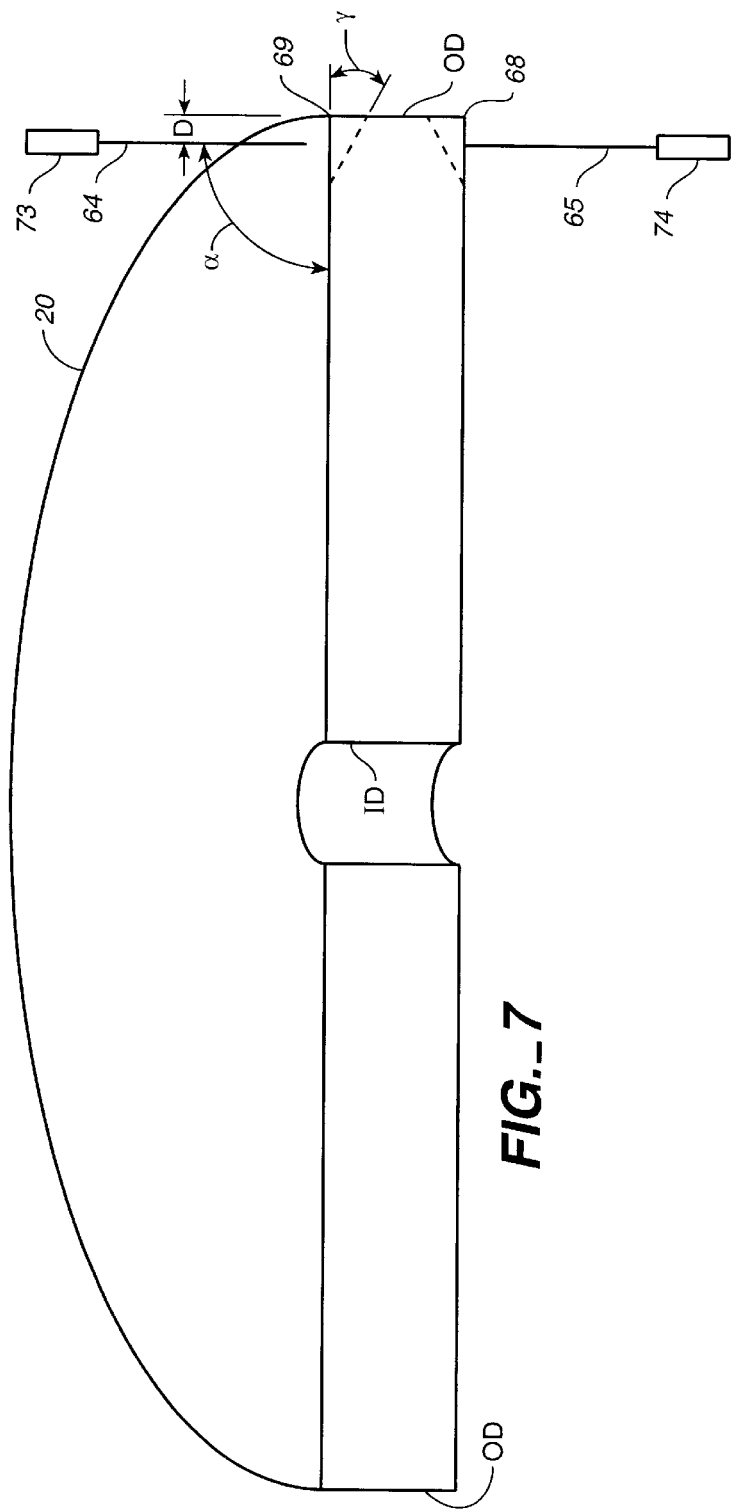
FIG._7
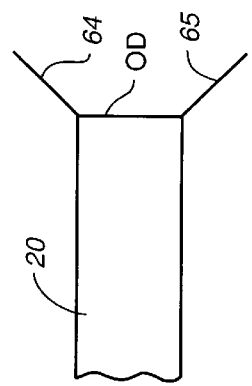
FIG._7A

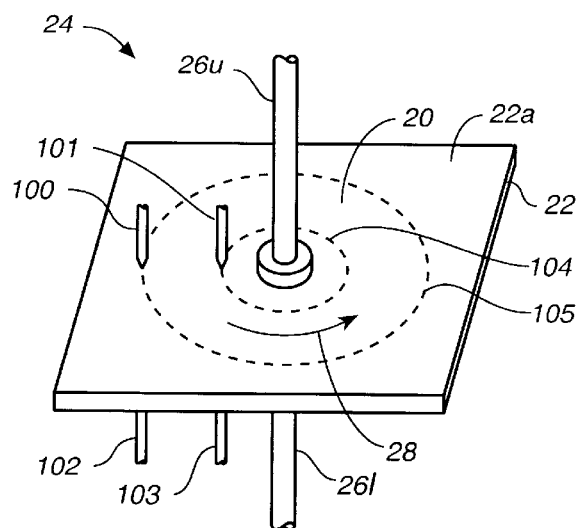
FIG._8
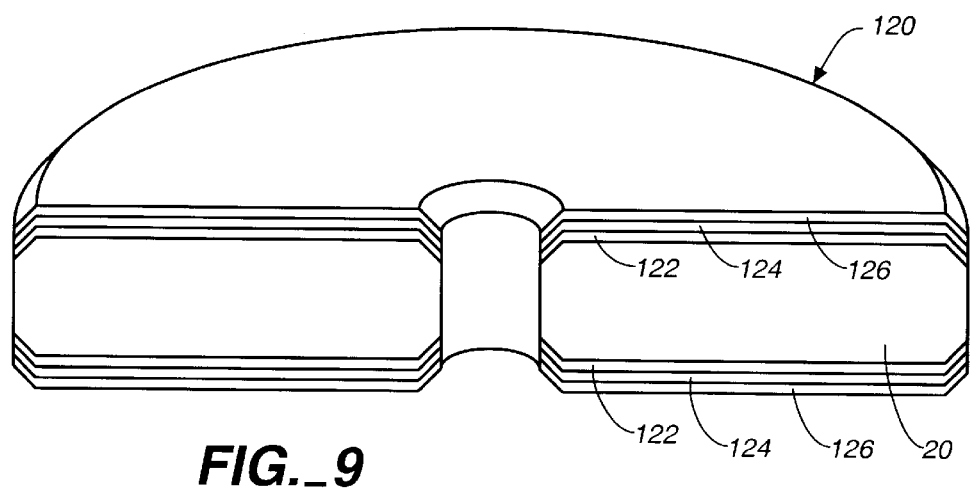
FIG._9

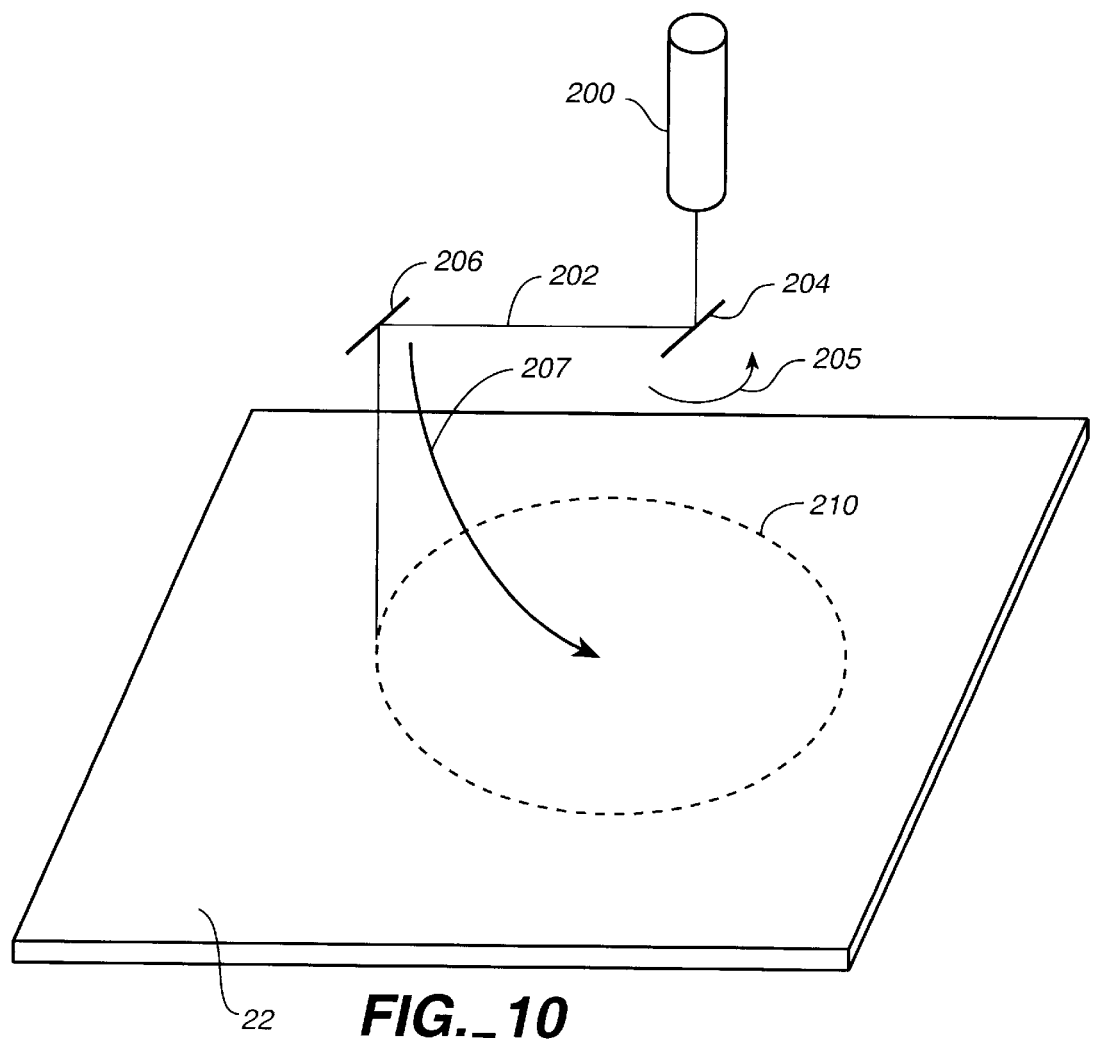
FIG._10

METHOD FOR MANUFACTURING A SUBSTANTIALLY CIRCULAR SUBSTRATE BY UTILIZING SCRIBING

This application is a continuation-in-part of our co-pending U.S. patent now abandoned application Ser. No. 09/391,139, filed Sep. 7, 1999, now abendoned incorporated herein by reference.

BACKGROUND OF THE INVENTION

This invention relates to the manufacture of substrates for magnetic disks.

It is known in the art to use glass as a substrate material to manufacture magnetic disks. During substrate manufacturing, disk-shaped substrates are cut out of a sheet or square of glass. This is typically accomplished by providing a sheet 1 of glass (FIG. 1), and cutting sheet 1 into squares 2 of glass. Thereafter, glass substrates 3 are cut out of squares 2. Glass is typically cut by scribing and breaking. (Scribing is accomplished using either diamond or laser scribing. The scribe marks are shown in FIG. 1 as dotted lines.) During scribing, glass square 2 is mounted on an x-y stage, which moves square 2 against a diamond scribing instrument for the case of diamond scribing. For the case of laser scribing, the x-y stage moves glass square 2 while a laser beam is directed toward the glass. After scribing, the glass is broken along the scribe line. As can be seen, two sets of scribe lines must be formed on square 2—an inner diameter scribe line 4 and an outer diameter scribe line 5. For magnetic disk applications, scribe lines 4 and 5 must be circular, concentric, and precisely positioned. Unfortunately, there are several problems with this manufacturing method.
1. It is difficult to achieve good concentricity with an x-y stage.
2. It is difficult to achieve precise control over the motion of the x-y stage as it moves in a circle. (X-y stages achieve a positional tolerance of about 60 μm, which is outside the requirements for most magnetic disk applications.)
3. X-y stages are slow.

Another problem with this scribing method is that during breaking, the resulting edge of the glass substrate is jagged. This is due in part to the fact that although the glass break line starts at the scribe line, the break line will tend to form between defects or weak regions in the glass. FIG. 2 illustrates in cross section glass square 2 and a break line 6 resulting from scribing and breaking square 2. Referring to FIG. 2, although break line 6 starts at scribe line 5, break line 6 follows a jagged path, typically extending between scribe line 5 and defects such as defect 7. The result is that the edge of the substrate is poorly defined, jagged and sharp. To remedy this situation, the substrate must be subjected to expensive edge polishing processes.

SUMMARY

A method for cutting a workpiece in accordance with one embodiment of the invention comprises mounting the workpiece on a rotating spindle, and scribing the workpiece while it is rotating. Advantageously, the workpiece can be scribed more rapidly using this technique than if an x-y stage were employed. Further, the position of the scribe line can be more precisely controlled than if an x-y stage were employed.

In one embodiment, the workpiece is formed into a substrate for use in magnetic disk manufacturing. The inner and outer diameters of the substrate are formed by scribing using the above-mentioned rotating spindle. It is easier to scribe inner and outer diameter scribe lines, and to maintain concentricity of these scribe lines, using the above-mentioned spindle than if an x-y stage were employed.

In one embodiment, both inner and outer diameter scribe lines are scribed simultaneously. This increases throughput, and reduces manufacturing expense.

In accordance with a second embodiment of the invention, both sides of a workpiece are scribed simultaneously. Because scribe lines are formed on both sides of the workpiece, the resulting break line will extend between the scribe line on one side of the workpiece and the scribe line on the other side of the workpiece. The resulting scribe line is less jagged and better defined than if only one side of the workpiece was scribed. Because both sides of the workpiece are scribed simultaneously, throughput is increased.

In one embodiment, the workpiece is mechanically scribed. In another embodiment, the workpiece is scribed using a radiant energy source such as a laser and then broken along the laser-induced scribe line. In another embodiment, after subjecting the workpiece to laser scribing, the workpiece is etched. The portion of the workpiece exposed to the laser etches more rapidly than the portions of the workpiece that have not been exposed to the laser. Accordingly, grooves are formed at the locations where the workpiece has been etched. These grooves serve as scribe lines to help initiate the crack and provide a smooth workpiece edge after breaking.

In one embodiment, the workpiece is glass or glass ceramic. However, the workpiece can be other materials as well. Brittle materials are particularly suited to this method.

BRIEF DESCRIPTION OF THE DRAWINGS

FIG. 1 schematically illustrates a glass sheet cut into substrates in accordance with the prior art.

FIG. 2 illustrates a glass workpiece being broken at a scribe line in accordance with the prior art.

FIG. 3 illustrates in cross section a glass workpiece mounted to a spindle in accordance with the present invention.

FIG. 4 illustrates in cross section scribe lines formed on both sides of the glass workpiece, and break lines extending between the scribe lines.

FIG. 5 illustrates a workpiece that has been laser scribed and etched using a method in accordance with the invention.

FIG. 6 illustrates in cross section a substrate including chamfers at its inner and outer diameter.

FIG. 7 illustrates laser beams being used to form chamfers on a substrate.

FIG. 7A illustrates laser beams striking the substrate from different angles to chamfer the substrate.

FIG. 8 illustrates a substrate being mechanically scribed using a method in accordance with the invention.

FIG. 9 illustrates in cross section a magnetic disk formed using a substrate made in accordance with the invention.

FIG. 10 illustrates apparatus for scribing a workpiece using rotating laser beams.

DETAILED DESCRIPTION

Embodiment of Making a Substrate Using a Laser

A method in accordance, with the invention comprises cutting a substrate 20 out of a workpiece 22 (FIG. 3). Workpiece 22 is typically a brittle material such as glass or glass ceramic. If workpiece 22 is glass, it can be aluminosilicate or borosilicate glass formed by the float method, down drawing, or other technique. Alternatively, workpiece 22 can be other types of glass as well. In one embodiment, workpiece 22 is square shaped, but this is not critical to the invention.

Workpiece 22 is rotatably mounted at a scribing station 24. In one embodiment, workpiece 22 is mounted between an upper rotating spindle 26u and a lower rotating spindle 26l that rotate workpiece 22, e.g. in the direction of arrow 28. While workpiece 22 is rotated, it is scribed by laser beams 30, 32, 34 and 36. Laser beams 30 and 32 form scribe lines 38 and 40 on a top side 22a of workpiece 22. Scribe lines 38 and 40 define the inner and outer diameters of the substrate being formed. Laser beams 34 and 36 scribe the bottom side of workpiece 22 to form corresponding scribe lines 42 and 44 on a bottom side 22b of workpiece 22. (Scribe lines 42 and 44 are shown in FIG. 4.) Scribe lines 42 and 44 also define the inner and outer diameters of the substrate being formed.

It will be appreciated that scribe lines for both the inner and outer diameters of the substrate are formed simultaneously, both on the top side and the bottom side of workpiece 22. Because of the manner in which these scribe lines are formed, it is easy to maintain good concentricity of the inner and outer diameters.

It will also be appreciated that because typically scribe lines 38 to 44 are formed simultaneously, throughput is enhanced.

FIG. 3 shows that laser beams 30, 32, 34 and 36 are generated by associated lasers 50, 52, 54 and 56. However, in an alternative embodiment, laser beams 30 to 36 are generated by two lasers, each providing an output beam to a beam splitter to thereby provide a total of four laser beams. Alternatively, beams 30 to 36 could be formed by a single laser that provides an output laser beam to a set of beam splitters to thereby provide a total of four laser beams.

While FIG. 3 shows four laser beams forming four scribe lines simultaneously, on one embodiment, there is only one laser beam which forms one scribe line at a time. More typically, two laser beams are used to form two scribe lines simultaneously. In such an embodiment, one laser beam is typically used to scribe one side of the substrate while the other laser beam scribes the other side of the workpiece, e.g. to define either the ID or the OD. The lasers are then moved, and are used to scribe the workpiece to form either the OD or the ID.

Because workpiece 22 is scribed using a rotating spindle system, the following advantages are achieved.

1. One can laser scribe both sides of workpiece 22 with good alignment and fast throughput since both sides are scribed simultaneously.
2. During manufacturing, one provides four scribe lines: lines 38 and 40, on upper surface 22a of workpiece 22, and corresponding lines on lower surface 22b of workpiece 22. Scribe lines 38 and 40 (and the corresponding lines on the lower surface of the workpiece) must be concentric. Because of the manner in which workpiece 22 is mounted and rotated, one can easily achieve good concentricity, whether both or only one side of workpiece 22 is scribed at a time. This is difficult to achieve if workpiece 22 is mounted on a x-y stage.
3. One can achieve good dimensional tolerance, e.g. less than about plus or minus 25 $\mu$m, whereas typical x-y stages moving in a circle achieve a tolerance of about 60 $\mu$m. (A tolerance of 60 $\mu$m is outside the requirements for most magnetic disk applications).
4. One can laser scribe workpiece 22 more rapidly by rotating it during scribing than if an x-y stage is used.
5. It is believed that apparatus that rotates workpiece 22 during scribing will become important for the disk industry because x-y stage machines have difficulty (i.e. low yield and low throughput) in meeting the strict dimensional tolerances required in hard disk drives.

As mentioned above, scribe lines are preferably placed on both the upper and lower surfaces of workpiece 22. FIG. 4 illustrates a portion of workpiece 22 in cross section after scribing. As can be seen, workpiece 22 comprises scribe lines 38 and 40 on its top surface 22a, and corresponding scribe lines 42 and 44 on its bottom surface 22b. Thus, when workpiece 22 is subjected to breaking, it will tend to break along break lines 45 and 46. Breakline 45 extends between aligned scribe lines 38 and 42, and is less jagged, straighter, smoother and better defined than break line 6 of FIG. 2. Similarly, break line 46 extends between aligned scribe lines 40 and 44, and is likewise less jagged, straighter, smoother and better defined than break line 6. Because of this, the resulting substrate does not have to be subjected to grinding and/or polishing to the same extent as substrate 3.

Workpiece 22 can be any appropriate material, e.g. glass, glass ceramic, or other brittle material. In one embodiment, workpiece 22 is borosilicate glass. In another embodiment, workpiece 22 is aluminosilicate glass. If workpiece 22 is glass, preferably laser beams 30 to 36 have a wavelength that is readily absorbed by glass, e.g. 2 to 10.6 microns or greater. Such a laser beam can be generated by a $CO_2$ laser, which provides a laser beam having a wavelength of 10.6 microns. However, other laser beams can be used, e.g. as described in U.S. Pat. No. 5,776,220, incorporated herein by reference. In one embodiment, the laser beams can be generated by lasers such as device model no. SBM777 or SBM333 available from PTG Precision Technology Center of Lake Mary, Florida. The power density provided by the laser is typically between 0.5 and 50 W/cm$^2$. The scribing speed typically depends on the power density and the workpiece thickness. With this range of power densities, scribing speeds of 0.1 to 1 m/s can be achieved. The higher the scribing speed and/or the greater the thickness of the workpiece, the higher the power density required. The spot size of the laser beam at the surface of the workpiece is typically between a few microns and a few millimeters, and in one embodiment between a few tens of microns and a few millimeters.

In an alternative embodiment, lasers having wavelengths in the UV range can be used. Such lasers can be used to form smaller spot sizes and increased depth of focus.

Optionally, after laser scribing, but before breaking, workpiece 22 is subjected to an etching process. This etching process typically uses an acidic, aqueous etching solution comprising fluoride ions. Examples of solutions that can be used to etch the workpiece (for the case of a glass workpiece) include HF solutions, a solution comprising ammonium bifluoride and phosphoric acid, or a solution comprising ammonium bifluoride and sulfuric acid. (HF is hazardous to humans. Therefore, other acidic fluoride-containing materials may be preferable to HF).

One example of an etching solution comprises 5 wt. % ammonium bifluoride and 5% by volume of $H_2SO_4$ at room temperature. A surfactant such as toluene sulfonic acid can be used. This material is sold as Eltesol TSX/A, manufactured by Albright & Wilson Corp. The etching solution is typically ultrasonically agitated, e.g. at a frequency up to 68 KHz, e.g. between 28 KHz and 68 KHz. In one embodiment, the etching solution is agitated at 40 KHz.

Other appropriate etching solutions are described in the above-incorporated '140 or '887 applications.

The portion of workpiece 22 that has been exposed to the above-mentioned laser beam etches more rapidly than the portions of workpiece 22 that have not been subjected to the laser beam. Thus, grooves, such as grooves 38a to 44a (FIG. 5) are etched into workpiece 22 at the locations where it has been subjected to the laser beam. As a result, break line 45a between grooves 38a and 42a, and break line 46a between grooves 40a and 44a, exhibit improved smoothness and straightness. Breaking can be accomplished by applying a mechanical force to the workpiece on each side of the grooves. This can be accomplished by a method as simple as using a pair of piers, or can involve providing a jig that applies a load equally distributed around the entire surface of the product piece or the waste piece. Alternatively, breaking can be accomplished by applying thermal stress to the workpiece, e.g. by applying a large temperature differential across the grooves. This can be done by applying heating/cooling to specific areas using jets of cold air (e.g. vapor from liquid nitrogen) or localized heating/cooling through physical contact with a heated/cooled material such as metal. Thermal shocking through heat-quench cycles may also suffice to impart the necessary driving force for crack initiation.

During substrate manufacturing, typically chamfers are provided at the inner and outer edges of the substrate, e.g. chamfers 60a, 60b formed at the outer diameter ("OD") and chamfers 62a, 62b formed at the inner diameter ("ID") (FIG. 6). Above-incorporated U.S. patent application Ser. No. 09/391,139 indicates that chamfers can be formed during a laser scribing and etching process. However, in another embodiment of the invention, chamfers 60 and 62 are provided by applying laser beams 64 and 65 to corners 68 and 69 of substrate 20, respectively, e.g. as shown in FIG. 7. During this step, substrate 20 is held at its ID and rotated. Laser beams 64 and 65 cut away the corners of the substrate, thereby resulting in chamfers 60 at the OD of substrate 20 (FIG. 6). Different laser parameters can be used, depending on the types of material being chamfered and the desired amount of material removal. In one embodiment, the laser power is 1 to 3W (e.g. 1.5 W), the beam spot size is about 100 $\mu$m and the cutting rate is 20 to 30 mm/second on borosilicate glass to achieve a 45 degree chamfer. The laser spot is typically focused on the substrate surface. Alternatively, other glasses such as aluminosilicate glass can be used.

In one embodiment, the laser strikes the substrate at an angle a of about 90 degrees. For a given laser power, the further from the OD that laser beam 64 strikes substrate 20 (i.e. the greater the distance D), the smaller the angle $\gamma$ of the chamfer. Alternatively, for a given laser power, the closer to the OD that beam 64 strikes substrate 20, the greater the angle $\gamma$. One can also increase angle $\gamma$ by increasing the laser power.

Although FIG. 7 shows two laser beams 64, 65 being generated by associated lasers 73, 74, in one embodiment, laser beams 64 and 65 are generated by a single laser and a beam splitter, and are directed to corners 68, 69 by mirrors.

Although FIG. 7 shows laser beams 64, 65 forming an angle of 90 degrees with the major surface of substrate 20, in other embodiments, laser beams 64, 65 approach substrate 20 from other angles, e.g. as shown in FIG. 7A.

Also, although FIG. 7 shows two lasers being used to chamfer substrate 20, in one embodiment, only one laser is present, and this laser is used to chamfer one corner of one edge at a time.

After chamfers 60 are formed, substrate 20 is held at its OD and rotated, and the process is repeated to form chamfers 62 at the ID of substrate 20.

While both the ID and OD of substrate 20 are typically chamfered, in one embodiment, only the ID is chamfered, and the OD is not chamfered. (The chamfering requirements of the ID and OD of a substrate depend in part on how and where the substrate and resulting disk are handled during disk manufacturing and during the drive assembly process). In another embodiment, only the OD is chamfered and not the ID. In yet another embodiment, both the ID and OD are chamfered, but have different shaped chamfers.

In yet another embodiment, only the corners adjacent the upper surface of substrate 20 (both ID and OD) are chamfered, but not the corners adjacent the lower surface. In yet another embodiment, only the corners adjacent the lower surface are chamfered. (It is noted that some magnetic disks only contain a magnetic layer on one surface of the disk). In yet another embodiment, there are chamfers on the corners adjacent both the upper and lower surfaces of the substrate, but the chamfer shape adjacent the upper surface is different from the chamfer shape adjacent the lower surface.

At this stage of the manufacturing process, substrate 20 can be subjected to a light polishing process. In one embodiment, the polishing process is as described in U.S. patent application Ser. No. 09/262,365, filed Mar. 4, 1999 by Bajorek et al., incorporated herein by reference. In another embodiment, polishing is as described in U.S. patent application Ser. No. 09/391,140, filed Sep. 7, 1999, filed by Homola et al., incorporated herein by reference. However, other polishing techniques can be used as well.

Completion of a Magnetic Disk After Forming the Substrate

After substrate 20 is formed, it is used to manufacture a magnetic disk 120 (FIG. 9). In one embodiment, a portion of substrate 20 is textured, e.g. as taught in U.S. patent application Ser. No. 09/390,887, filed by Homola on Sep. 7, 1999, incorporated herein by reference. Thereafter, one or more underlayers 122 (typically one or more of Cr, a Cr alloy, NiP or NiAl), one or more magnetic layers 124 (typically a Co alloy or a Fe alloy) and a protective overcoat 126 are deposited on one or both sides of substrate 20, thereby forming a magnetic disk 120 (shown in cross section in FIG. 9). These layers can be formed by sputtering. Details concerning sputtered layers on a magnetic disk are discussed in U.S. patent application Ser. No. 08/984,753, filed by Bertero et al. on Dec. 4, 1997, incorporated herein by reference. While FIG. 9 shows these layers deposited on both sides of substrate 20, in other embodiments, they are formed on only one side of substrate 20.

In one embodiment, underlayer 122 is 15 to 20 nm thick. A thin CoCrTa layer (e.g. about 2 nm thick) is provided on the underlayer, a 17 nm thick CoCrPtTa magnetic layer 124 is formed on the CoCrTa layer, a 7 nm thick carbon protective overcoat 126 is formed on the magnetic layer, and a 1.5 to 2 nm thick lubricant layer is applied to the carbon layer.

Embodiment Including a Protective Layer

In one embodiment, a protective layer is formed on both sides of workpiece 22 prior to laser scribing. A portion of the protective layer is burned away by the laser during scribing. The remaining portion of the protective layer serves as a mask, protecting workpiece 22 from the etching solution, and helping to ensure a desired profile in the walls of the grooves being etched.

Thereafter, the protective layer is removed, and the workpiece is subjected to breaking as described above. (Alternatively, the protective layer can be removed after breaking).

Embodiment Comprising Rotating Laser Beams

Instead of rotating workpiece 22, in one embodiment, the source of a laser beam can be rotated while workpiece 22 is stationary. For example, in FIG. 10, a laser source 200 provides a laser beam 202 to a rotating mirror 204 (rotating in the direction of arrow 205), which reflects laser beam 202 toward a revolving mirror 206 (revolving as indicated by arrow 207). Mirror 206 reflects laser beam 202 toward workpiece 22. The rotation and revolving of mirrors 202 and 206 cause laser beam 202 to trace out a circular scribe line 210 on workpiece 22.

A set of lasers and/or beam splitters can be used to provide one or more laser beams on one or both sides of workpiece 22 to form appropriate scribe lines on workpiece 22.

Just as rotating laser beams can be used to form scribe lines on workpiece 22, rotating laser beams can also be used to form chamfers 60 and 62, described above.

Embodiment of Making a Substrate Using Mechanical Scribing

In another embodiment, instead of using laser scribing, mechanical scribing tools 100, 101, 102 and 103 are used to scribe workpiece 22 while workpiece 22 is rotated in direction 28 (see FIG. 8). In one embodiment, scribing tools 100 to 103 are diamond scribing tools, and they provide scribe lines 104 and 105 on the top side 22a of workpiece 22, and corresponding scribe lines (not shown) on the bottom side of workpiece 22. Scribe lines 104 and 105 correspond to the ID and OD, respectively, of the substrate being manufactured. Embodiments such as FIG. 8 that use a spindle to rotate workpiece 22 enjoy the benefits discussed above with respect to the embodiment of FIG. 3. Further, embodiments such as FIG. 8 that scribe both sides of workpiece 22 enjoy the benefits discussed above with respect to FIG. 4.

While FIG. 8 illustrates four scribing tools 100 to 103, in other embodiments, only two scribing tools are used. In such an embodiment, two scribe lines are formed at a time, e.g. a scribe line on the top of workpiece 22 and a scribe line on the bottom of workpiece 22. After forming a first pair of scribe lines (e.g. defining the ID or OD of the substrate), the scribe tools are moved and another pair of scribe lines is formed.

In yet another embodiment, two scribe tools are used simultaneously on one side of workpiece 22 but not the other side of workpiece 22.

In yet another embodiment, one scribe tool is used to form one scribe line at a time.

While FIG. 8 illustrates workpiece 22 being rotated while the scribing tools remain stationary, in an alternative embodiment, workpiece remains stationary while the scribing tools are rotated.

While the invention has been described with respect to a specific embodiment, those skilled in the art will appreciate that changes can be made in form and detail without departing from the spirit and scope of the invention. For example, different types of substrate materials can be used. Also, one can use the present invention to scribe both sides of workpieces to form structures other than magnetic disk substrates. One can also rotate a workpiece to form workpieces other than disk substrates. In one embodiment, the workpiece and laser can be mounted so as to cut ellipses or other conical sections having the characteristic of eccentricity. Chamfering of corners of the substrate can be performed on corners that are rounded by previous processing or are already partially chamfered. Accordingly, all such changes come within the present invention.

We claim:

1. A method for forming a substantially circular substrate from a workpiece, wherein said workpiece has first and second major surfaces, comprising;

rotating the workpiece;

applying a first scribing tool to said first major surface of the workpiece during said rotating to thereby form a substantially circular first scribe line, further applying a second scribing tool to said second major surface of the workpiece during said rotating to thereby form a substantially circular second scribe line, and further comprising the act of breaking said workpiece along said first and second scribe lines; and wherein said first scribing tool forms the first scribe line that defines an inner diameter of said substrate, and said second scribing tool forms the second scribe line that defines an outer diameter of said substrate.

2. Method of claim 1, wherein said first scribing tool is a mechanical scribing tool.

3. Method of claim 1, wherein said first scribing tool is a laser beam.

4. Method of claim 1, wherein said first and second scribe lines are formed simultaneously.

5. Method of claim 1, wherein said first and second scribe lines are not formed simultaneously.

6. Method of claim 1, wherein said act of breaking forms a portion of said workpiece into a substrate, said method further comprising depositing a magnetic layer on said substrate.

7. Method of claim 1, further comprising the act of forming an underlayer on said substrate prior to said act of depositing a magnetic layer on said substrate.

8. Method of claim 1, wherein said workpiece is mounted on a spindle and spun during said act of rotating.

9. Method of claim 1, further comprising the act of applying a laser to a corner of a workpiece to thereby form a chamfer on said corner.

10. Method of claim 1, wherein said workpiece is disk-shaped and has top and bottom surfaces and an outer edge, said outer edge and said top surface forming a first corner, said outer edge and bottom surface forming a second corner, wherein during said method, a laser is applied to said first and second corners to provide first and second chamfers at said outer edge.

11. Method of claim 1, wherein said workpiece is disk-shaped and has top and bottom surfaces and an inner edge, said inner edge and said top surface forming a first corner, said inner edge and bottom surface forming a second corner, wherein during said method, a laser is applied to said first and second corners to provide first and second chamfers at said first inner edge.

12. Method for forming a magnetic disk comprising:

chamfering the corners of a substrate formed according to claim 1, at the inner diameter and outer diameter of the substrate, the chamfers at the inner diameter having a different shape or size from the chamfers at the outer diameter.

13. Method of according to claim 1, wherein the workpiece is glass.

14. A method for forming a substantially circular substrate from a workpiece, comprising:

rotating the workpiece;

scribing both sides of the workpiece by forming scribe lines on upper and lower surfaces of said workpiece by using a first and a second scribing tool, said scribe line on said upper surface being aligned with the scribe line on said lower surface, and breaking said workpiece along said scribe lines on said upper and lower surfaces;

wherein said first scribing tool forms the first scribe line that defines an inner diameter of said substrate, and said second scribing tool forms the second scribe line that defines an outer diameter of said substrate.

15. Method of claim 14, wherein said workpiece is generally planar.

16. Method of claim 14, wherein said scribe lines are formed by a mechanical scribing tool.

17. Method of claim 14, wherein said scribe lines are formed by a laser.

18. Method of claim 14, further comprising the act of etching said workpiece prior to breaking.

19. Method of claim 14, wherein after said act of breaking, a portion of said workpiece serves as a substrate, said method further comprising the act of depositing a magnetic layer on said substrate.

20. Method of claim 14, further comprising the act of depositing an underlayer on said substrate prior to said act of depositing a magnetic layer on said substrate.

21. Method of claim 14, further comprising the act of applying a laser to a corner of a workpiece to thereby form a chamfer on said corner.

22. Method of claim 21, further comprising the act of rotating said workpiece during said act of applying a laser to said corner.

23. Method of claim 14, wherein said workpiece is disk-shaped and has top and bottom surfaces and an outer edge, said outer edge and said top surface forming a first corner, said outer edge and bottom surface forming a second corner, wherein during said method, a laser is applied to said first and second corners to provide first and second chamfers at said outer edge.

24. Method of claim 14, wherein said workpiece is disk-shaped and has top and bottom surfaces and an inner edge, said inner edge and said top surface forming a first corner, said inner edge and bottom surface forming a second corner, wherein during said method, a laser is applied to said first and second corners to provide first and second chamfers at said first inner edge.

25. Method for forming a magnetic disk comprising:
chamfering the corners of a substrate formed according to claim 14, at the inner diameter and outer diameter of the substrate, the chamfers at the inner diameter having a different shape or size from the chamfers at the outer diameter.

26. Method of according to claim 14, wherein the workpiece is glass.

27. A method for forming a substantially circular substrate from a workpiece wherein said workpiece has first and second major surfaces, comprising:
applying a first scribing tool to said first major surface of the workpiece; and rotating said first scribing tool during said applying to thereby form a substantially circular first scribe line,
further applying a second scribing tool to said second major surface of the workpiece; and rotating said second scribing tool during said applying to thereby form a substantially circular second scribe line,
and further comprising the act of breaking said workpiece along said first and second scribe lines,
wherein said first scribing tool forms the first scribe line that defines an inner diameter of said substrate, and said second scribing tool forms the second scribe line that defines an outer diameter of said substrate.

28. Method of claim 27, wherein said tool is a mechanical scribing tool.

29. Method of claim 27, wherein said tool is a laser.

30. Method of claim 27, further comprising the act of rotating said workpiece during said act of applying a laser to said corner.

31. Method of claim 27, further comprising the act of applying a laser to a corner of a workpiece to thereby form a chamfer on said corner.

32. Method of claim 31, further comprising the act of rotating said workpiece during said act of applying a laser to said corner.

33. Method of claim 27, wherein said workpiece is disk-shaped and has top and bottom surfaces and an outer edge, said outer edge and said top surface forming a first corner, said outer edge and bottom surface forming a second corner, wherein during said method, a laser is applied to said first and second corners to provide first and second chamfers at said outer edge.

34. Method of claim 27, wherein said workpiece is disk-shaped and has top and bottom surfaces and an inner edge, said inner edge and said top surface forming a first corner, said inner edge and bottom surface forming a second corner, wherein during said method, a laser is applied to said first and second corners to provide first and second chamfers at said first inner edge.

35. Method for forming a magnetic disk comprising:
chamfering the corners of a substrate formed according to claim 27, at the inner diameter and outer diameter of the substrate, the chamfers at the inner diameter having a different shape or size from the chamfers at the outer diameter.

36. Method of according to claim 27, wherein the workpiece is glass.

* * * * *